US008520871B2

(12) United States Patent
Breebaart et al.

(10) Patent No.: US 8,520,871 B2

(45) **Date of Patent: *Aug. 27, 2013**

(54) METHOD OF AND DEVICE FOR GENERATING AND PROCESSING PARAMETERS REPRESENTING HRTFS

(75) Inventors: Jeroen Dirk Breebaart, Veldhoven (NL); Michel Machiel Willem Van Loon, Valkenswaard (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,314

(22) Filed: Jul. 11, 2012

(65) Prior Publication Data

US 2012/0275606 A1 Nov. 1, 2012

Related U.S. Application Data

(62) Division of application No. 12/066,507, filed as application No. PCT/IB2006/053125 on Sep. 6, 2006, now Pat. No. 8,243,969.

(30) Foreign Application Priority Data

Sep. 13, 2005 (EP) ..................................... 05108404

(51) Int. Cl.
*H04R 5/00* (2006.01)
*H04R 5/02* (2006.01)
*H04H 20/47* (2008.01)
*H04B 15/00* (2006.01)

(52) U.S. Cl.
USPC ........ 381/309; 381/1; 381/2; 381/17; 381/18; 381/94.2; 381/310

(58) Field of Classification Search
USPC ............................................ 381/309, 17, 310
See application file for complete search history.

(56) References Cited

U.S. PATENT DOCUMENTS 5,438,623 A * 8/1995 Begault ............................ 381/17
5,440,639 A * 8/1995 Suzuki et al. ................... 381/17

(Continued)

FOREIGN PATENT DOCUMENTS

JP 2004361573 S 12/2004
WO 9531881 A1 11/1995

(Continued)

OTHER PUBLICATIONS

Torres et al: Low-Order Modeling of Head-Related Transfer Functions Using Wavelet Transforms: Proceedings of TEH 2004 International Symposium on Circuits and Systems, May 23-26, 2004, vol. 3, III 513-516.

(Continued)

*Primary Examiner* — David S. Warren
*Assistant Examiner* — Christina Russell

(57) ABSTRACT

A device for processing parameters representing Head-Related Transfer Functions includes an input stage configured to receive audio signals of sound sources, a determinor configured to receive reference parameters representing Head-Related Transfer Functions and configured to determine, from the audio signals, position information representing positions and/or directions of the sound sources. A processor is configured to process the audio signals; and an influencer is configured to influence the processing of the audio signals based on the position information yielding an influenced output audio signal.

8 Claims, 4 Drawing Sheets

(56) References Cited

U.S. PATENT DOCUMENTS

| | | | | |
|---|---|---|---|---|
| 5,467,401 | A * | 11/1995 | Nagamitsu et al. | 381/63 |
| 5,659,619 | A * | 8/1997 | Abel | 381/17 |
| 6,072,877 | A * | 6/2000 | Abel | 381/17 |
| 6,118,875 | A * | 9/2000 | Møller et al. | 381/1 |
| 6,243,476 | B1 * | 6/2001 | Gardner | 381/303 |
| 6,795,556 | B1 * | 9/2004 | Sibbald et al. | 381/17 |
| 8,243,969 | B2 * | 8/2012 | Breebaart et al. | 381/309 |
| 2003/0035553 | A1 * | 2/2003 | Baumgarte et al. | 381/94.2 |
| 2003/0219130 | A1 * | 11/2003 | Baumgarte et al. | 381/17 |
| 2004/0076301 | A1 * | 4/2004 | Algazi et al. | 381/17 |
| 2004/0105550 | A1 * | 6/2004 | Aylward et al. | 381/17 |
| 2004/0170281 | A1 * | 9/2004 | Nelson et al. | 381/17 |
| 2006/0115091 | A1 * | 6/2006 | Kim et al. | 381/18 |
| 2007/0133831 | A1 * | 6/2007 | Kim et al. | 381/313 |
| 2007/0223708 | A1 * | 9/2007 | Villemoes et al. | 381/17 |
| 2008/0304670 | A1 * | 12/2008 | Breebaart | 381/17 |
| 2011/0026745 | A1 * | 2/2011 | Said et al. | 381/310 |

FOREIGN PATENT DOCUMENTS

| | | | |
|---|---|---|---|
| WO | 9725834 | | 7/1997 |
| WO | 9934527 | A1 | 7/1999 |
| WO | 2004072956 | A1 | 8/2004 |

OTHER PUBLICATIONS

Engdegard WT AL: "Synthetic Ambiance in Parametric Stereo Coding"; Proceedings of the 116TH AES Convention, May 8-11, Berlin, Germany, 12 PAGE Document.

* cited by examiner

METHOD OF AND DEVICE FOR GENERATING AND PROCESSING PARAMETERS REPRESENTING HRTFS

CROSS-REFERENCE TO RELATED APPLICATIONS

This is a divisional application of U.S. patent application Ser. No. 12/066,507, filed Mar. 12, 2008.

FIELD OF THE INVENTION

The invention relates to a method of generating parameters representing Head-Related Transfer Functions.

The invention also relates to a device for generating parameters representing Head-Related Transfer Functions.

The invention further relates to a method of processing parameters representing Head-Related Transfer Functions.

Moreover, the invention relates to a program element.

Furthermore, the invention relates to a computer-readable medium.

BACKGROUND OF THE INVENTION

As the manipulation of sound in virtual space begins to attract people's attention, audio sound, especially 3D audio sound, becomes more and more important in providing an artificial sense of reality, for instance, in various game software and multimedia applications in combination with images. Among many effects that are heavily used in music, the sound field effect is thought of as an attempt to recreate the sound heard in a particular space.

In this context, 3D sound, often termed as spatial sound, is understood as sound processed to give a listener the impression of a (virtual) sound source at a certain position within a three-dimensional environment.

An acoustic signal coming from a certain direction to a listener interacts with parts of the listener's body before this signal reaches the eardrums in both ears of the listener. As a result of such an interaction, the sound that reaches the eardrums is modified by reflections from the listener's shoulders, by interaction with the head, by the pinna response and by the resonances in the ear canal. One can say that the body has a filtering effect on the incoming sound. The specific filtering properties depend on the sound source position (relative to the head). Furthermore, because of the finite speed of sound in air, the significant inter-aural time delay can be noticed, depending on the sound source position. Here Head-Related Transfer Functions (HRTFs) come into play. Such Head-Related Transfer Functions, more recently termed the anatomical transfer function (ATF), are functions of azimuth and elevation of a sound source position that describe the filtering effect from a certain sound source direction to a listener's eardrums.

An HRTF database is constructed by measuring, with respect to the sound source, transfer functions from a large set of positions to both ears. Such a database can be obtained for various acoustical conditions. For example, in an anechoic environment, the HRTFs capture only the direct transfer from a position to the eardrums, because no reflections are present. HRTFs can also be measured in echoic conditions. If reflections are captured as well, such an HRTF database is then room-specific.

HRTF databases are often used to position 'virtual' sound sources. By convolving a sound signal by a pair of HRTFs and presenting the resulting sound over headphones, the listener can perceive the sound as coming from the direction corresponding to the HRTF pair, as opposed to perceiving the sound source 'in the head', which occurs when the unprocessed sounds are presented over headphones. In this respect, HRTF databases are a popular means for positioning virtual sound sources.

OBJECT AND SUMMARY OF THE INVENTION

It is an object of the invention to improve the representation and processing of Head-Related Transfer Functions.

In order to achieve the object defined above, a method of generating parameters representing Head-Related Transfer Functions, a device for generating parameters representing Head-Related Transfer Functions, a method of processing parameters representing Head-Related Transfer Functions, a program element and a computer-readable medium as defined in the independent claims are provided.

In accordance with an embodiment of the invention, a method of generating parameters representing Head-Related Transfer Functions is provided, the method comprising the steps of splitting a first frequency-domain signal representing a first Head-Related impulse response signal into at least two sub-bands, and generating at least one first parameter of at least one of the sub-bands based on a statistical measure of values of the sub-bands.

Furthermore, in accordance with another embodiment of the invention, a device for generating parameters representing Head-Related Transfer Functions is provided, the device comprising a splitting unit adapted to split a first frequency-domain signal representing a first Head-Related impulse response signal into at least two sub-bands, and a parameter-generation unit adapted to generate at least one first parameter of at least one of the sub-bands based on a statistical measure of values of the sub-bands.

In accordance with another embodiment of the invention, a computer-readable medium is provided, in which a computer program for generating parameters representing Head-Related Transfer Functions is stored, which computer program, when being executed by a processor, is adapted to control or carry out the above-mentioned method steps.

Moreover, a program element for processing audio data is provided in accordance with yet another embodiment of the invention, which program element, when being executed by a processor, is adapted to control or carry out the above-mentioned method steps.

In accordance with a further embodiment of the invention, a device for processing parameters representing Head-Related Transfer Functions is provided, the device comprising an input stage adapted to receive audio signals of sound sources, determining means adapted to receive reference-parameters representing Head-Related Transfer Functions and adapted to determine, from said audio signals, position information representing positions and/or directions of the sound sources, processing means for processing said audio signals, and influencing means adapted to influence the processing of said audio signals based on said position information yielding an influenced output audio signal.

Processing audio data for generating parameters representing Head-Related Transfer Functions according to the invention can be realized by a computer program, i.e. by software, or by using one or more special electronic optimization circuits, i.e. in hardware, or in a hybrid form, i.e. by means of software components and hardware components. The software or software components may be previously stored on a data carrier or transmitted through a signal transmission system.

The characterizing features according to the invention particularly have the advantage that Head-Related Transfer Functions (HRTFs) are represented by simple parameters leading to a reduction of computational complexity when applied to audio signals.

Conventional HRTF databases are often relatively large in terms of the amount of information. Each time-domain impulse response can comprise about 64 samples (for low-complexity, anechoic conditions) up to several thousands of samples long (in reverberant rooms). If an HRTF pair is measured at 10 degrees resolution in vertical and horizontal directions, the amount of coefficients to be stored amounts to at least 360/10*180/10*64=41472 coefficients (assuming 64-sample impulse responses) but can easily become an order of magnitude larger. A symmetrical head would require (180/10)*(180/10)*64 coefficients (which is half of 41472 coefficients).

According to an advantageous aspect of the invention, multiple simultaneous sound sources may be synthesized with a processing complexity that is roughly equal to that of a single sound source. With a reduced processing complexity, real-time processing is advantageously possible, even for a large number of sound sources.

In a further aspect, given the fact that the parameters described above are determined for a fixed set of frequency ranges, this results in a parameterization that is independent of a sampling rate. A different sampling rate only requires a different table on how to link the parameter frequency bands to the signal representation.

Furthermore, the amount of data to represent the HRTFs is significantly reduced, resulting in reduced storage requirements, which in fact is an important issue in mobile applications.

Further embodiments of the invention will be described hereinafter with reference to the dependent claims.

Embodiments of the method of generating parameters representing Head-Related Transfer Functions will now be described. These embodiments may also be applied for the device for generating parameters representing Head-Related Transfer Functions, for the computer-readable medium and for the program element.

According to a further aspect of the invention, splitting of a second frequency-domain signal representing a second Head-Related impulse response signal into at least two sub-bands of the second Head-Related impulse response signal, and generating at least one second parameter of at least one of the sub-bands of the second Head-Related impulse response signal based on a statistical measure of values of the sub-bands and a third parameter representing a phase angle between the first frequency-domain signal and the second frequency-domain signal per sub-band is performed.

In other words, according to the invention, a pair of Head-Related impulse response signals, i.e. a first Head-Related impulse response signal and a second Head-Related impulse response signal, is described by a delay parameter or phase difference parameter between the corresponding Head-Related impulse response signals of the impulse response pair, and by an average root mean square (rms) of each impulse response in a set of frequency sub-bands. The delay parameter or phase difference parameter may be a single (frequency-independent) value or may be frequency-dependent.

In this respect, it is advantageous from a perceptual point of view if the pair of Head-Related impulse response signals, i.e. the first Head-Related impulse response signal and the second Head-Related impulse response signal, belong to the same spatial position.

In particular cases such as, for instance, customization for optimization purposes, it may be advantageous if the first frequency-domain signal is obtained by sampling with a sample length a first time-domain Head-Related impulse response signal using a sampling rate yielding a first time-discrete signal, and transforming the first time-discrete signal to the frequency domain yielding said first frequency-domain signal.

The transform of the first time-discrete signal to the frequency domain is advantageously based on a Fast Fourier Transform (FFT) and splitting of the first frequency-domain signal into the sub-band is based on grouping FFT bins. In other words, the frequency bands for determining scale factors and/or time/phase differences are preferably organized in (but not limited to) so-called Equivalent Rectangular Bandwidth (ERB) bands.

HRTF databases usually comprise a limited set of virtual sound source positions (typically at a fixed distance and 5 to 10 degrees of spatial resolution). In many situations, sound sources have to be generated for positions in between measurement positions (especially if a virtual sound source is moving across time). Such a generation of positions in between measurement positions requires interpolation of available impulse responses. If HRTF databases comprise responses for vertical and horizontal directions, a bi-linear interpolation has to be performed for each output signal. Hence, a combination of four impulse responses for each headphone output signal is required for each sound source. The number of required impulse responses becomes even more important if more sound sources have to be "virtualized" simultaneously.

In one aspect of the invention, typically between 10 and 40 frequency bands are used. According to the measures of the invention, interpolation can be advantageously performed directly in the parameter domain and hence requires interpolation of 10 to 40 parameters instead of a full-length HRTF impulse response in the time domain. Moreover, due to the fact that inter-channel phase (or time) and magnitudes are interpolated separately, advantageously phase-canceling artifacts are substantially reduced or may not occur.

In a further aspect of the invention, the first parameter and second parameter are processed in a main frequency range, and the third parameter representing a phase angle is processed in a sub-frequency range of the main frequency range. Both empirical results and scientific evidence have shown that phase information is practically redundant from a perceptual point of view for frequencies above a certain frequency limit.

In this respect, an upper frequency limit of the sub-frequency range is advantageously in a range between two (2) kHz to three (3) kHz. Hence, further information reduction and complexity reduction can be obtained by neglecting any time or phase information above this frequency limit.

A main field of application of the measures according to the invention is in the area of processing audio data. However, the measures may be embedded in a scenario in which, in addition to the audio data, additional data are processed, for instance, related to visual content. Thus, the invention can be realized in the frame of a video data-processing system.

The application according to the invention may be realized as one of the devices of the group consisting of a portable audio player, a portable video player, a head-mounted display, a mobile phone, a DVD player, a CD player, a hard disk-based media player, an internet radio device, a vehicle audio system, a public entertainment device and an MP3 player. The application of the devices may be preferably designed for games, virtual reality systems or synthesizers.

Although the mentioned devices relate to the main fields of application of the invention, other applications are possible, for example, in telephone-conferencing and telepresence; audio displays for the visually impaired; distance learning systems and professional sound and picture editing for television and film as well as jet fighters (3D audio may help pilots) and pc-based audio players.

In yet another aspect of the invention, the parameters mentioned above may be transmitted across devices. This has the advantage that every audio-rendering device (PC, laptop, mobile player, etc.) may be personalized. In other words, somebody's own parametric data is obtained that is matched to his or her own ears without the need of transmitting a large amount of data as in the case of conventional HRTFs. One could even think of downloading parameter sets over a mobile phone network. In that domain, transmission of a large amount of data is still relatively expensive and a parameterized method would be a very suitable type of (lossy) compression.

In still another embodiment, users and listeners could also exchange their HRTF parameter sets via an exchange interface if they like. Listening through someone else's ears may be made easily possible in this way.

The aspects defined above and further aspects of the invention are apparent from the embodiments to be described hereinafter and will be explained with reference to these embodiments.

BRIEF DESCRIPTION OF THE DRAWINGS

The invention will be described in more detail hereinafter with reference to examples of embodiments, to which the invention is not limited.

DESCRIPTION OF EMBODIMENTS

Figure 6:
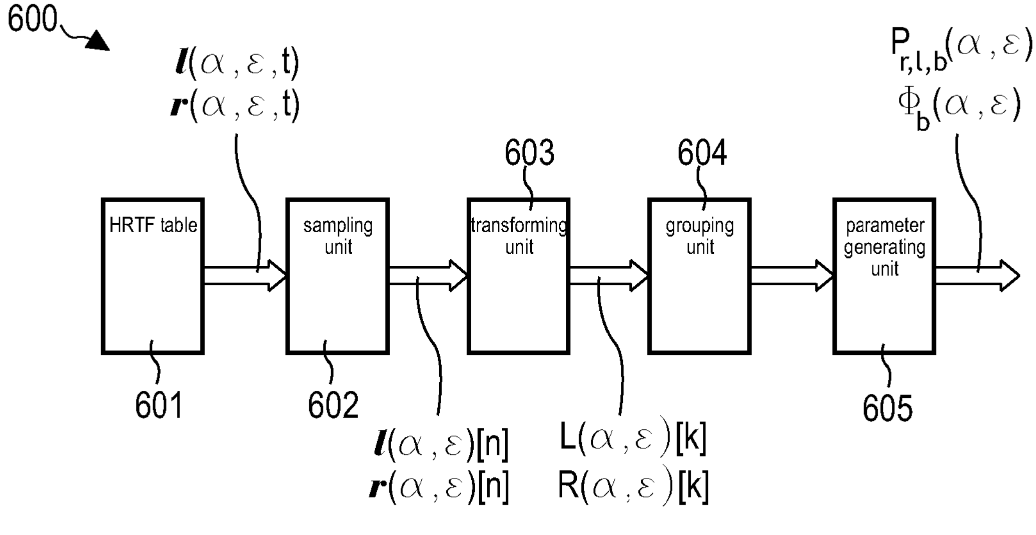
FIG. 6 shows a device for generating parameters representing Head-Related Transfer Functions (HRTFs) in accordance with a preferred embodiment of the invention.

The illustrations in the drawings are schematic. In different drawings, similar or identical elements are denoted by the same reference signs.

A device 600 for generating parameters representing Head-Related Transfer Functions (HRTFs) will now be described with reference to FIG. 6.

The device 600 comprises an HRTF-table 601, a sampling unit 602, a transforming unit 603, a splitting unit 604 and a parameter-generating unit 605.

The HRTF-table 601 has stored at least a first time-domain HRTF impulse response signal $l(\alpha,\epsilon,t)$ and a second time-domain HRTF impulse response signal $r(\alpha,\epsilon,t)$ both belonging to the same spatial position. In other words, the HRTF-table has stored at least one time-domain HRTF impulse response pair $(l(\alpha,\epsilon,t), r(\alpha,\epsilon,t))$ for virtual sound source position. Each impulse response signal is represented by an azimuth angle $\alpha$ and an elevation angle $\epsilon$. Alternatively, the HRTF-table 601 may be stored on a remote server and HRTF impulse response pairs may be provided via suitable network connections.

In the sampling unit 602, these time-domain signals are sampled with a sample length n to derive at their digital (discrete) representations using a sampling rate $f_s$, i.e. in the present case yielding a first time-discrete signal $l(\alpha,\epsilon)[n]$ and a second time-discrete signal $r(\alpha,\epsilon)[n]$:

$$l(\alpha,\varepsilon)[n] = \begin{cases} l\left(\alpha,\varepsilon,\frac{nt}{f_s}\right) & \text{for } 0 \le n < N-1 \\ 0 & \text{otherwise} \end{cases} \quad (1)$$

$$r(\alpha,\varepsilon)[n] = \begin{cases} r\left(\alpha,\varepsilon,\frac{nt}{f_s}\right) & \text{for } 0 \le n < N-1 \\ 0 & \text{otherwise} \end{cases} \quad (2)$$

In the present case, a sampling rate $f_s$=44.1 kHz is used. Alternatively, another sampling rate may be used, for example, 16 kHz or 22.05 kHz or 32 kHz or 48 kHz.

Subsequently, in the transforming unit 603, these discrete-time representations are transformed to the frequency domain using a Fourier transform, resulting in their complex-valued frequency-domain representations, i.e. a first frequency-domain signal $L(\alpha,\epsilon)[k]$ and a second frequency-domain signal $R(\alpha,\epsilon)[k]$ (k=0 . . . K−1):

$$L(\alpha,\varepsilon)[k] = \sum_n l(\alpha,\varepsilon)[n]e^{-2\pi jnk/K} \quad (3)$$

$$R(\alpha,\varepsilon)[k] = \sum_n r(\alpha,\varepsilon)[n]e^{-2\pi jnk/K} \quad (4)$$

Next, in splitting unit 604, the frequency-domain signals are split into sub-bands b by grouping FFT bins k of the respective frequency-domain signals. As such, a sub-band b comprises FFT bins $k\epsilon k_b$. This grouping process is preferably performed in such a way that the resulting frequency bands have a non-linear frequency resolution in accordance with psycho-acoustical principles or, in other words, the frequency resolution is preferably matched to the non-uniform frequency resolution of the human hearing system. In the present case, twenty (20) frequency bands are used. It may be mentioned that more frequency bands may be used, for example, forty (40), or fewer frequency bands, for example, ten (10).

Furthermore, in parameter-generating unit 605, parameters of the sub-bands based on a statistical measure of values of the sub-bands are generated and calculated, respectively. In the present case, a root-mean-square operation is used as the statistical measure. Alternatively, also according to the invention, the mode or median of the power spectrum values in a sub-band may be used to advantage as the statistical measure or any other metric (or norm) that increases monotonically with the (average) signal level in a sub-band.

In the present case, the root-mean-square signal parameter $P_{l,b}(\alpha,\epsilon)$ in sub-band b for signal $L(\alpha,\epsilon)[k]$ is given by:

$$P_{l,b}(\alpha,\varepsilon) = \sqrt{\frac{1}{|k_b|}\sum_{k\in k_b} L(\alpha,\varepsilon)[k]L^*(\alpha,\varepsilon)[k]} \quad (5)$$

Similarly, the root-mean-square signal parameter $P_{r,b}(\alpha,\epsilon)$ in sub-band b for signal $R(\alpha,\epsilon)[k]$ is given by:

$$P_{r,b}(\alpha,\varepsilon) = \sqrt{\frac{1}{|k_b|}\sum_{k\in k_b} R(\alpha,\varepsilon)[k]R^*(\alpha,\varepsilon)[k]} \quad (6)$$

Here, (*) denotes the complex conjugation operator, and $|k_b|$ denotes the number of FFT bins k corresponding to sub-band b.

Finally, in parameter-generating unit 605, an average phase angle parameter $\phi_b(\alpha,\epsilon)$ between signals $L(\alpha,\epsilon)[k]$ and $R(\alpha,\epsilon)[k]$ for sub-band b is generated, which in the present case is given by:

$$\phi_b(\alpha, \varepsilon) = \angle\left(\sum_{k \in k_b} L(\alpha, \varepsilon)[k] R^*(\alpha, \varepsilon)[k]\right) \quad (7)$$

In accordance with a further embodiment of the invention, based on FIG. 6, an HRTF-table 601' is provided. In contrast to the HRTF-table 601 of FIG. 6, this HRTF-table 601' provides HRTF impulse responses already in a frequency domain; for example, the FFTs of the HRTFs are stored in the table. Said frequency-domain representations are directly provided to a splitting unit 604' and the frequency-domain signals are split into sub-bands b by grouping FFT bins k of the respective frequency-domain signals. Next, a parameter-generating unit 605' is provided and adapted in a similar way as the parameter-generating unit 605 described above.

A device 100 for processing input audio data $X_i$ and parameters representing Head-Related Transfer Functions in accordance with an embodiment of the invention will now be described with reference to FIG. 1.

The device 100 comprises a summation unit 102 adapted to receive a number of audio input signals $X_1 \ldots X_i$ for generating a summation signal SUM by summing all the audio input signals $X_1 \ldots X_i$. The summation signal SUM is supplied to a filter unit 103 adapted to filter said summation signal SUM on the basis of filter coefficients, i.e. in the present case a first filter coefficient SF1 and a second filter coefficient SF2, resulting in a first audio output signal OS1 and a second audio output signal OS2. A detailed description of the filter unit 103 is given below.

Figure 1:
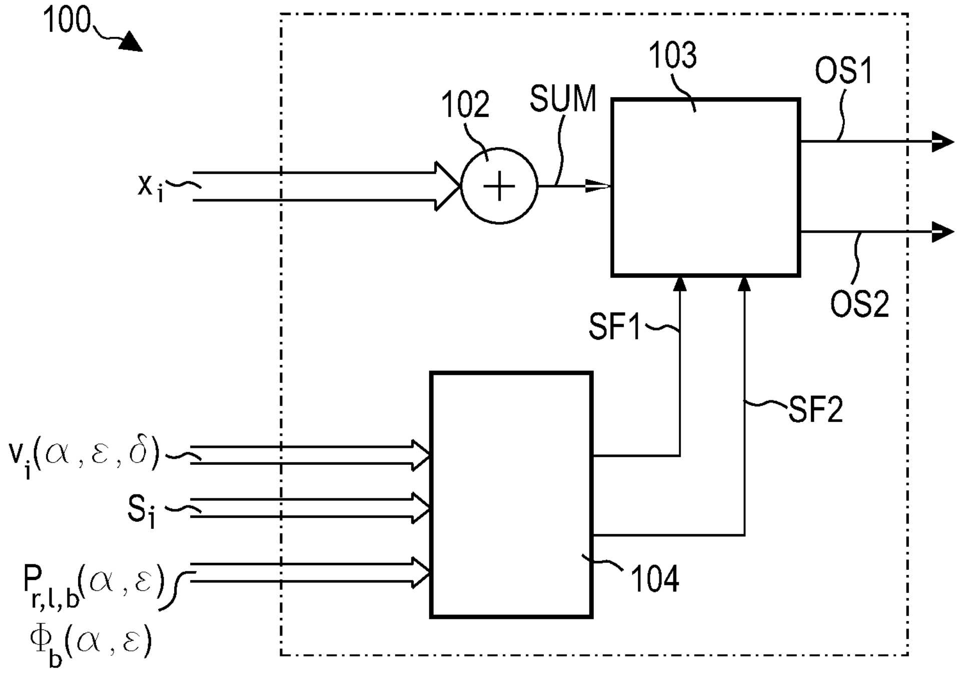
FIG. 1 shows a device for processing audio data in accordance with a preferred embodiment of the invention.

Furthermore, as shown in FIG. 1, device 100 comprises a parameter conversion unit 104 adapted to receive, on the one hand, position information $V_i$, which is representative of spatial positions of sound sources of said audio input signals $X_i$ and, on the other hand, spectral power information $S_i$, which is representative of a spectral power of said audio input signals $X_i$, wherein the parameter conversion unit 104 is adapted to generate said filter coefficients SF1, SF2 on the basis of the position information $V_i$ and the spectral power information $S_i$ corresponding to input signal i, and wherein the parameter conversion unit 104 is additionally adapted to receive transfer function parameters and generate said filter coefficients additionally in dependence on said transfer function parameters.

Figure 2:
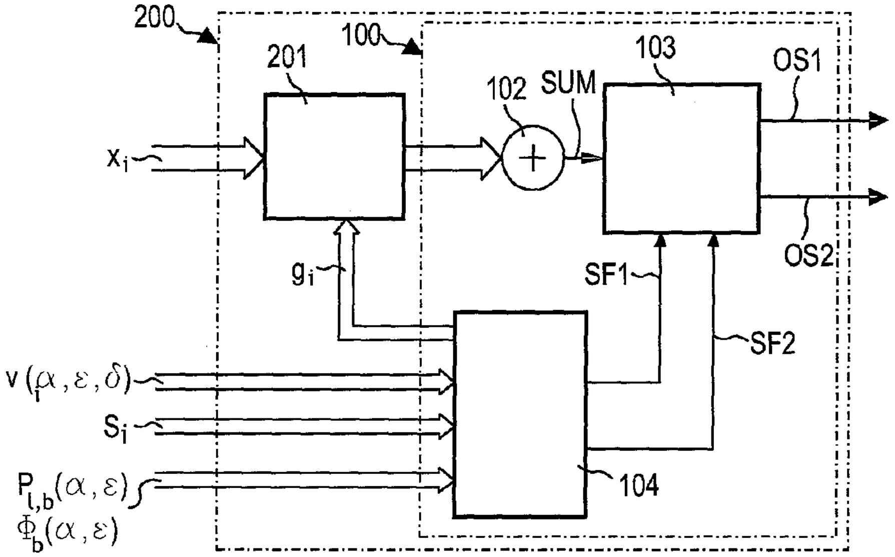
FIG. 2 shows a device for processing audio data in accordance with a further embodiment of the invention.

FIG. 2 shows an arrangement 200 in a further embodiment of the invention. The arrangement 200 comprises a device 100 in accordance with the embodiment shown in FIG. 1 and additionally comprises a scaling unit 201 adapted to scale the audio input signals $X_i$ on gain factors $g_i$. In this embodiment, the parameter conversion unit 104 is additionally adapted to receive distance information representative of distances of sound sources of the audio input signals and generate the gain factors $g_i$ based on said distance information and provide these gain factors $g_i$ to the scaling unit 201. Hence, an effect of distance is reliably achieved by means of simple measures.

An embodiment of a system or device according to the invention will now be described in more detail with reference to FIG. 3.

Figure 3:
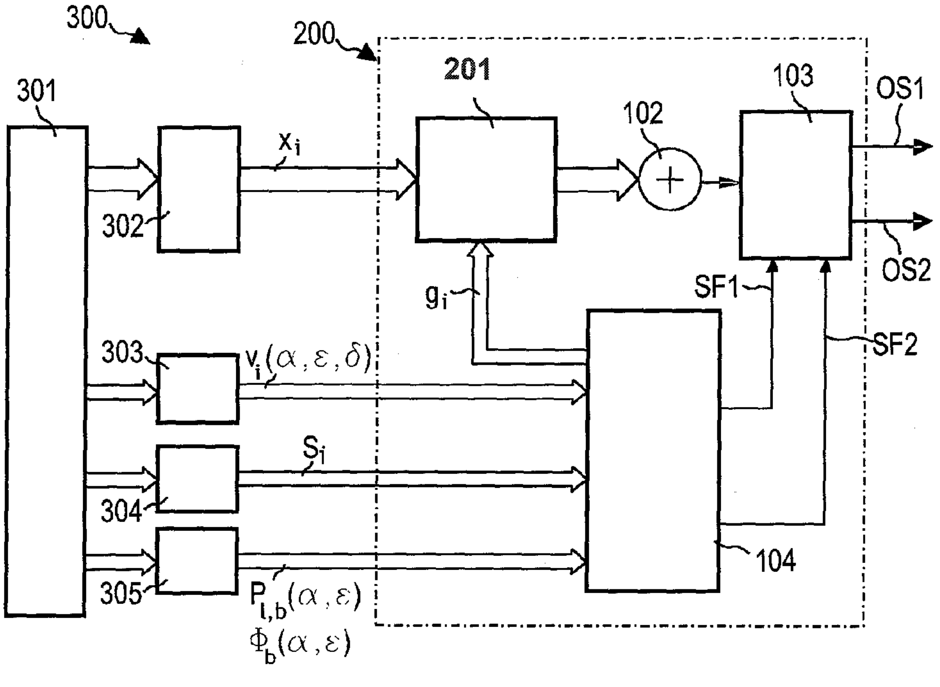
FIG. 3 shows a device for processing audio data in accordance with an embodiment of the invention, comprising a storage unit.

In the embodiment of FIG. 3, a system 300 is shown, which comprises an arrangement 200 in accordance with the embodiment shown in FIG. 2 and additionally comprises a storage unit 301, an audio data interface 302, a position data interface 303, a spectral power data interface 304 and a HRTF parameter interface 305.

The storage unit 301 is adapted to store audio waveform data, and the audio data interface 302 is adapted to provide the number of audio input signals $X_i$ based on the stored audio waveform data.

In the present case, the audio waveform data is stored in the form of pulse code-modulated (PCM) wave tables for each sound source. However, waveform data may be stored additionally or separately in another form, for instance, in a compressed format as in accordance with the standards MPEG-1 layer3 (MP3), Advanced Audio Coding (AAC), AAC-Plus, etc.

In the storage unit 301, also position information $V_i$ is stored for each sound source, and the position data interface 303 is adapted to provide the stored position information $V_i$.

In the present case, the preferred embodiment is directed to a computer game application. In such a computer game application, the position information $V_i$ varies over time and depends on the programmed absolute position in a space (i.e. virtual spatial position in a scene of the computer game), but it also depends on user action, for example, when a virtual person or user in the game scene rotates or changes his virtual position, the sound source position relative to the user changes or should change as well.

In such a computer game, everything is possible from a single sound source (for example, a gunshot from behind) to polyphonic music with every music instrument at a different spatial position in a scene of the computer game. The number of simultaneous sound sources may be, for instance, as high as sixty-four (64) and, accordingly, the audio input signals $X_i$ will range from $X_1$ to $X_{64}$.

The interface unit 302 provides the number of audio input signals $X_i$ based on the stored audio waveform data in frames of size n. In the present case, each audio input signal $X_i$ is provided with a sampling rate of eleven (11) kHz. Other sampling rates are also possible, for example, forty-four (44) kHz for each audio input signal $X_i$.

In the scaling unit 201, the input signals $X_i$ of size n, i.e. $X_i[n]$, are combined into a summation signal SUM, i.e. a mono signal m[n], using gain factors or weights $g_i$ per channel according to equation one (1):

$$m[n] = \sum_i g_i[n] x_i[n] \quad (8)$$

The gain factors $g_i$ are provided by the parameter conversion unit 104 based on stored distance information, accompanied by the position information $V_i$ as previously explained. The position information $V_i$ and spectral power information $S_i$ parameters typically have much lower update rates, for example, an update every eleventh (11) millisecond. In the present case, the position information $V_i$ per sound source consists of a triplet of azimuth, elevation and distance information. Alternatively, Cartesian coordinates (x,y,z) or alternative coordinates may be used. Optionally, the position information may comprise information in a combination or a sub-set, i.e. in terms of elevation information and/or azimuth information and/or distance information.

In principle, the gain factors $g_i[n]$ are time-dependent. However, given the fact that the required update rate of these gain factors is significantly lower than the audio sampling rate of the input audio signals $X_i$, it is assumed that the gain factors $g_i[n]$ are constant for a short period of time (as mentioned before, around eleven (11) milliseconds to twenty-three (23) milliseconds). This property allows frame-based processing, in which the gain factors $g_i$ are constant and the summation signal m[n] is represented by equation two (2):

$$m[n] = \sum_i g_i x_i[n] \qquad (9)$$

Filter unit 103 will now be explained with reference to FIGS. 4 and 5.

Figure 4:
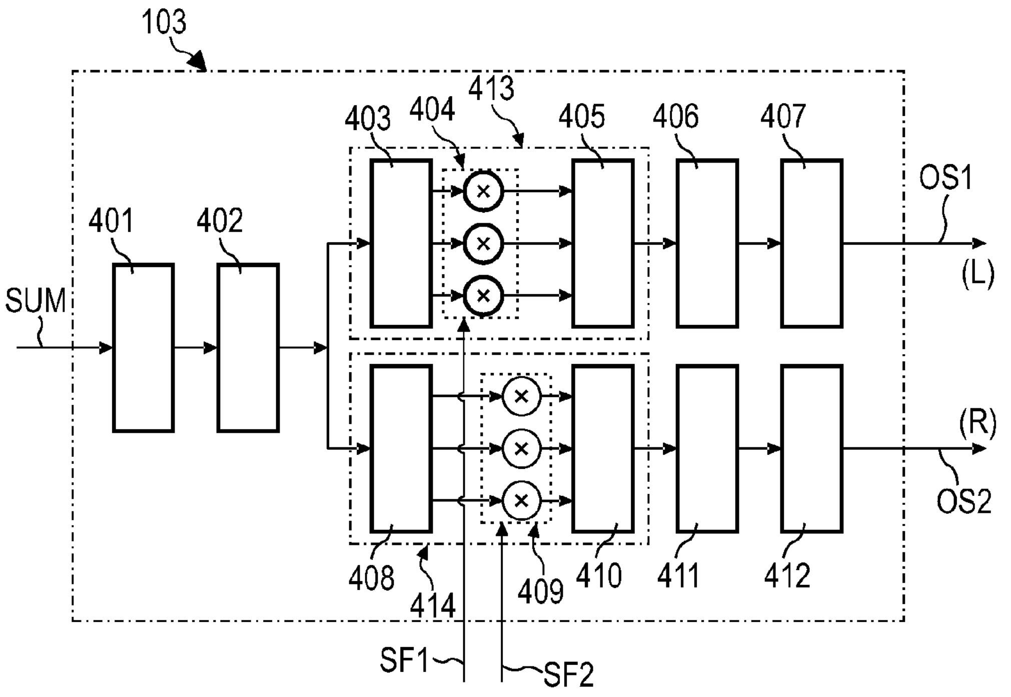
FIG. 4 shows in detail a filter unit implemented in the device for processing audio data shown in FIG. 1 or FIG. 2.

The filter unit 103 shown in FIG. 4 comprises a segmentation unit 401, a Fast Fourier Transform (FFT) unit 402, a first sub-band-grouping unit 403, a first mixer 404, a first combination unit 405, a first inverse-FFT unit 406, a first overlap-adding unit 407, a second sub-band-grouping unit 408, a second mixer 409, a second combination unit 410, a second inverse-FFT unit 411 and a second overlap-adding unit 412. The first sub-band-grouping unit 403, the first mixer 404 and the first combination unit 405 constitute a first mixing unit 413. Likewise, the second sub-band-grouping unit 408, the second mixer 409 and the second combination unit 410 constitute a second mixing unit 414.

The segmentation unit 401 is adapted to segment an incoming signal, i.e. the summation signal SUM, and signal m[n], respectively, in the present case, into overlapping frames and to window each frame. In the present case, a Hanning-window is used for windowing. Other methods may be used, for example, a Welch, or triangular window.

Subsequently, FFT unit 402 is adapted to transform each windowed signal to the frequency domain using an FFT.

In the given example, each frame m[n] of length N (n=0 . . . N−1) is transformed to the frequency domain using an FFT:

$$M[k] = \sum_i m[n]\exp(-2\pi jkn/N) \qquad (10)$$

This frequency-domain representation M[k] is copied to a first channel, further also referred to as left channel L, and to a second channel, further also referred to as right channel R. Subsequently, the frequency-domain signal M[k] is split into sub-bands b (b=0 . . . B−1) by grouping FFT bins for each channel, i.e. the grouping is performed by means of the first sub-band-grouping unit 403 for the left channel L and by means of the second sub-band-grouping unit 408 for the right channel R. Left output frames L[k] and right output frames R[k] (in the FFT domain) are then generated on a band-by-band basis.

The actual processing consists of modification (scaling) of each FFT bin in accordance with a respective scale factor that was stored for the frequency range to which the current FFT bin corresponds, as well as modification of the phase in accordance with the stored time or phase difference. With respect to the phase difference, the difference can be applied in an arbitrary way (for example, to both channels (divided by two) or only to one channel). The respective scale factor of each FFT bin is provided by means of a filter coefficient vector, i.e. in the present case the first filter coefficient SF1 provided to the first mixer 404 and the second filter coefficient SF2 provided to the second mixer 409.

In the present case, the filter coefficient vector provides complex-valued scale factors for frequency sub-bands for each output signal.

Then, after scaling, the modified left output frames L[k] are transformed to the time domain by the inverse FFT unit 406 obtaining a left time-domain signal, and the right output frames R[k] are transformed by the inverse FFT unit 411 obtaining a right time-domain signal. Finally, an overlap-add operation on the obtained time-domain signals results in the final time domain for each output channel, i.e. by means of the first overlap-adding unit 407 obtaining the first output channel signal OS1 and by means of the second overlap-adding unit 412 obtaining the second output channel signal OS2.

Figure 5:
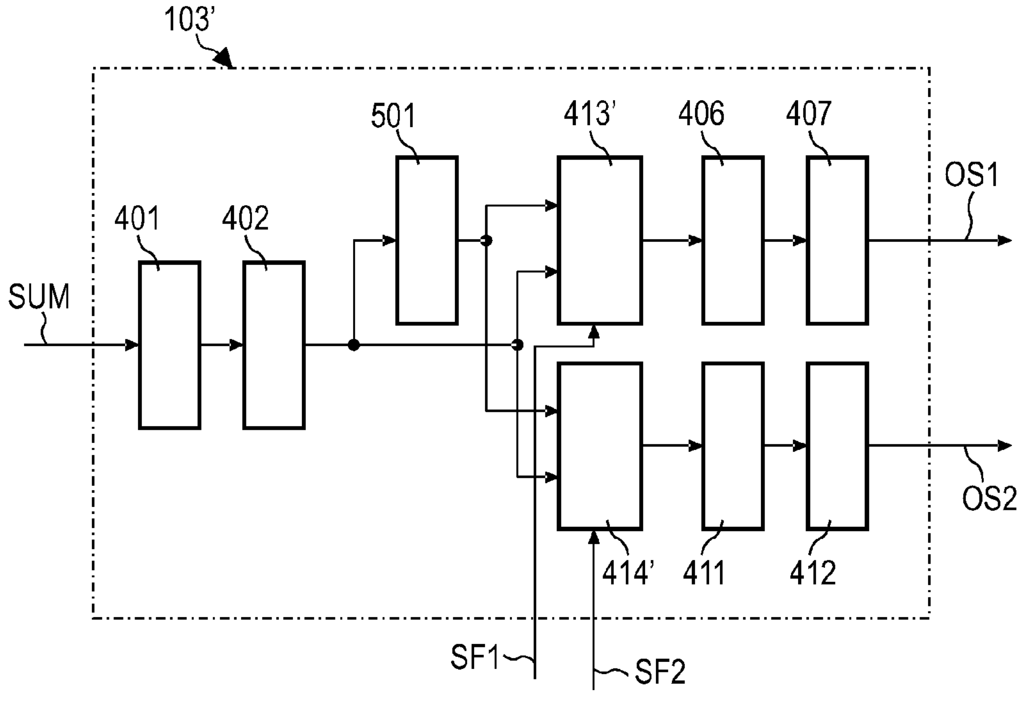
FIG. 5 shows a further filter unit in accordance with an embodiment of the invention.

The filter unit 103' shown in FIG. 5 deviates from the filter unit 103 shown in FIG. 4 in that a decorrelation unit 501 is provided, which is adapted to supply a decorrelation signal to each output channel, which decorrelation signal is derived from the frequency-domain signal obtained from the FFT unit 402. In the filter unit 103' shown in FIG. 5, a first mixing unit 413' similar to the first mixing unit 413 shown in FIG. 4 is provided, but it is additionally adapted to process the decorrelation signal. Likewise, a second mixing unit 414' similar to the second mixing unit 414 shown in FIG. 4 is provided, which second mixing unit 414' of FIG. 5 is also additionally adapted to process the decorrelation signal.

In this case, the two output signals L[k] and R[k] (in the FFT domain) are then generated as follows on a band-by-band basis:

$$\begin{cases} L_b[k] = h_{11,b}M_b[k] + h_{12,b}D_b[k] \\ R_b[k] = h_{21,b}M_b[k] + h_{22,b}D_b[k] \end{cases} \qquad (11)$$

Here, D[k] denotes the decorrelation signal that is obtained from the frequency-domain representation M[k] according to the following properties:

$$\forall (b) \begin{cases} \langle D_b, M_b^* \rangle = 0 \\ \langle D_b, D_b^* \rangle = \langle M_b, M_b^* \rangle \end{cases} \qquad (12)$$

wherein <..> denotes the expected value operator:

$$\langle X_b, Y_b^* \rangle = \sum_{k=k_b}^{k=k_{b+1}-1} X[k]Y^*[k] \qquad (13)$$

Here, (*) denotes complex conjugation.

The decorrelation unit 501 consists of a simple delay with a delay time of the order of 10 to 20 ms (typically one frame) that is achieved, using a FIFO buffer. In further embodiments, the decorrelation unit may be based on a randomized magnitude or phase response, or may consist of IIR or all-pass-like structures in the FFT, sub-band or time domain. Examples of such decorrelation methods are given in Engdegå rd, Heiko Purnhagen, Jonas Rödén, Lars Liljeryd (2004): "Synthetic ambiance in parametric stereo coding", proc. 116th AES convention, Berlin, the disclosure of which is herewith incorporated by reference.

The decorrelation filter aims at creating a "diffuse" perception at certain frequency bands. If the output signals arriving at the two ears of a human listener are identical, except for a time or level difference, the human listener will perceive the sound as coming from a certain direction (which depends on the time and level difference). In this case, the direction is very clear, i.e. the signal is spatially "compact".

However, if multiple sound sources arrive at the same time from different directions, each ear will receive a different mixture of sound sources. Therefore, the differences between the ears cannot be modeled as a simple (frequency-dependent) time and/or level difference. Since, in the present case, the different sound sources are already mixed into a single sound source, recreation of different mixtures is not possible. However, such a recreation is basically not required because the human hearing system is known to have difficulty in separating individual sound sources based on spatial properties. The dominant perceptual aspect in this case is how different the waveforms at both ears are if the waveforms for time and level differences are compensated. It has been shown that the mathematical concept of the inter-channel coherence (or maximum of the normalized cross-correlation function) is a measure that closely matches the perception of spatial 'compactness'.

The main aspect is that the correct inter-channel coherence has to be recreated in order to evoke a similar perception of the virtual sound sources, even if the mixtures at both ears are wrong. This perception can be described as "spatial diffuseness", or lack of "compactness". This is what the decorrelation filter, in combination with the mixing unit, recreates.

The parameter conversion unit 104 determines how different the waveforms would have been in the case of a regular HRTF system if these waveforms had been based on single sound source processing. Then, by mixing the direct and de-correlated signal differently in the two output signals, it is possible to recreate this difference in the signals that cannot be attributed to simple scaling and time delays. Advantageously, a realistic sound stage is obtained by recreating such a diffuseness parameter.

As already mentioned, the parameter conversion unit 104 is adapted to generate filter coefficients SF1, SF2 from the position vectors $V_i$ and the spectral power information $S_i$ for each audio input signal $X_i$. In the present case, the filter coefficients are represented by complex-valued mixing factors $h_{xx,b}$. Such complex-valued mixing factors are advantageous, especially in a low-frequency area. It may be mentioned that real-valued mixing factors may be used, especially when processing high frequencies.

The values of the complex-valued mixing factors $h_{xx,b}$ depend in the present case on, inter alia, transfer function parameters representing Head-Related Transfer Function (HRTF) model parameters $P_{l,b}(\alpha,\epsilon)$, $P_{r,b}(\alpha,\epsilon)$ and $\phi_b(\alpha,\epsilon)$: Herein, the HRTF model parameter $P_{l,b}(\alpha,\epsilon)$ represents the root-mean-square (rms) power in each sub-band b for the left ear, the HRTF model parameter $P_{r,b}(\alpha,\epsilon)$ represents the rms power in each sub-band b for the right ear, and the HRTF model parameter $\phi_b(\alpha,\epsilon)$ represents the average complex-valued phase angle between the left-ear and right-ear HRTF. All HRTF model parameters are provided as a function of azimuth ($\alpha$) and elevation ($\epsilon$). Hence, only HRTF parameters $P_{l,b}(\alpha,\epsilon)$, $P_{r,b}(\alpha,\epsilon)$ and $\phi_b(\alpha,\epsilon)$ are required in this application, without the necessity of actual HRTFs (that are stored as finite impulse-response tables, indexed by a large number of different azimuth and elevation values).

The HRTF model parameters are stored for a limited set of virtual sound source positions, in the present case for a spatial resolution of twenty (20) degrees in both the horizontal and vertical direction. Other resolutions may be possible or suitable, for example, spatial resolutions of ten (10) or thirty (30) degrees.

In an embodiment, an interpolation unit may be provided, which is adapted to interpolate HRTF model parameters in between the spatial resolution, which are stored. A bi-linear interpolation is preferably applied, but other (non-linear) interpolation schemes may be suitable.

By providing HRTF model parameters according to the present invention over conventional HRTF tables, an advantageous faster processing can be performed. Particularly in computer game applications, if head motion is taken into account, playback of the audio sound sources requires rapid interpolation between the stored HRTF data.

In a further embodiment, the transfer function parameters provided to the parameter conversion unit may be based on, and represent, a spherical head model.

In the present case, the spectral power information $S_i$ represents a power value in the linear domain per frequency sub-band corresponding to the current frame of input signal $X_i$. One could thus interpret $S_i$ as a vector with power or energy values $\sigma^2$ per sub-band:

$$S_i=[\sigma^2_{0,i},\sigma^2_{1,i},\ldots,\sigma^2_{b,i}]$$

The number of frequency sub-bands (b) in the present case is ten (10). It should be mentioned here that spectral power information $S_i$ may be represented by power value in the power or logarithmic domain, and the number of frequency sub-bands may achieve a value of thirty (30) or forty (40) frequency sub-bands.

The power information $S_i$ basically describes how much energy a certain sound source has in a certain frequency band and sub-band, respectively. If a certain sound source is dominant (in terms of energy) in a certain frequency band over all other sound sources, the spatial parameters of this dominant sound source get more weight on the "composite" spatial parameters that are applied by the filter operations. In other words, the spatial parameters of each sound source are weighted, using the energy of each sound source in a frequency band to compute an averaged set of spatial parameters. An important extension to these parameters is that not only a phase difference and level per channel is generated, but also a coherence value. This value describes how similar the waveforms that are generated by the two filter operations should be.

In order to explain the criteria for the filter factors or complex-valued mixing factors $h_{xx,b}$, an alternative pair of output signals, viz. L' and R', is introduced, which output signals L', R' would result from independent modification of each input signal $X_i$ in accordance with HRTF parameters $P_{l,b}(\alpha,\epsilon)$, $P_{r,b}(\alpha,\epsilon)$ and $\phi_b(\alpha,\epsilon)$, followed by summation of the outputs:

$$\begin{cases} L'[k] = \sum_i X_i[k]p_{l,b,i}(\alpha_i,\varepsilon_i)\dfrac{\exp(+j\phi_{b,i}(\alpha_i,\varepsilon_i)/2)}{\delta_i} \\ R'[k] = \sum_i X_i[k]p_{r,b,i}(\alpha_i,\varepsilon_i)\dfrac{\exp(-j\phi_{b,i}(\alpha_i,\varepsilon_i)/2)}{\delta_i} \end{cases} \tag{14}$$

The mixing factors $h_{xx,b}$ are then obtained in accordance with the following criteria:

1. The input signals $X_i$ are assumed to be mutually independent in each frequency band b:

$$\forall(b)\begin{cases} \langle X_{b,i}, X^*_{b,j}\rangle = 0 \text{ for } i \neq j \\ \langle X_{b,i}, X^*_{b,i}\rangle = \sigma^2_{b,i} \end{cases} \tag{15}$$

2. The power of the output signal L[k] in each sub-band b should be equal to the power in the same sub-band of a signal L'[k]:

$$\forall(b)(\langle L_b, L_b^* \rangle = \langle L_b', L_b'^* \rangle) \tag{16}$$

3. The power of the output signal R[k] in each sub-band b should be equal to the power in the same sub-band of a signal R' [k]:

$$\forall(b)(\langle R_b, R_b^* \rangle = \langle R_b', R_b'^* \rangle) \tag{17}$$

4. The average complex angle between signals L[k] and M[k] should equal the average complex phase angle between signals L'[k] and M[k] for each frequency band b:

$$\forall(b)(\angle\langle L_b, M_b^* \rangle = \angle\langle L_b', M_b'^* \rangle) \tag{18}$$

5. The average complex angle between signals R[k] and M[k] should equal the average complex phase angle between signals R' [k] and M[k] for each frequency band b:

$$\forall(b)(\angle\langle R_b, M_b^* \rangle = \angle\langle (R_b', M_b^* \rangle) \tag{19}$$

6. The coherence between signals L[k] and R[k] should be equal to the coherence between signals L'[k] and R'[k] for each frequency band b:

$$\forall(b)(|\langle L_b, R_b^* \langle | = | \rangle L_b, R_b'^* \rangle |) \tag{20}$$

It can be shown that the following (non-unique) solution fulfils the criteria above:

$$\begin{cases} h_{11,b} = H_{1,b}\cos(+\beta_b + \gamma_b) \\ h_{11,b} = H_{1,b}\sin(+\beta_b + \gamma_b) \\ h_{11,b} = H_{2,b}\cos(-\beta_b + \gamma_b) \\ h_{11,b} = H_{2,b}\cos(-\beta_b + \gamma_b) \end{cases} \tag{21}$$

with $$\beta_b = \frac{1}{2}\arccos\left(\frac{|\langle L_b', R_b'^* \rangle|}{\sqrt{\langle L_b', L_b'^* \rangle \langle R_b', R_b'^* \rangle}}\right) = \tag{22}$$

$$\frac{1}{2}\arccos\left(\frac{\sum_i p_{l,b,i}(\alpha_i, \varepsilon_i) p_{r,b,i}(\alpha_i, \varepsilon_i)\sigma_{b,i}^2 / \delta_i^2}{\sqrt{\sum_i p_{l,b,i}^2(\alpha_i, \varepsilon_i)\sigma_{b,i}^2 / \delta_i^2 \sum_i p_{r,b,i}^2(\alpha_i, \varepsilon_i)\sigma_{b,i}^2 / \delta_i^2}}\right)$$

$$\gamma_b = \arctan\left(\tan(\beta_b)\frac{|H_{2,b}| - |H_{1,b}|}{|H_{2,b}| + |H_{1,b}|}\right) \tag{23}$$

$$H_{1,b} = \exp(j\varphi_{L,b})\sqrt{\frac{\sum_i p_{l,b,i}^2(\alpha_i, \varepsilon_i)\sigma_{b,i}^2 / \delta_i^2}{\sum_i \sigma_{b,i}^2 / \delta_i^2}} \tag{24}$$

$$H_{2,b} = \exp(j\varphi_{R,b})\sqrt{\frac{\sum_i p_{r,b,i}^2(\alpha_i, \varepsilon_i)\sigma_{b,i}^2 / \delta_i^2}{\sum_i \sigma_{b,i}^2 / \delta_i^2}} \tag{25}$$

$$\varphi_{L,b} = \angle\left(\sum_i \exp(+j\varphi_{b,i}(\alpha_i, \varepsilon_i)/2) p_{l,b,i}(\alpha_i, \varepsilon_i)\sigma_{b,i}^2 / \delta_i^2\right) \tag{26}$$

$$\varphi_{R,b} = \angle\left(\sum_i \exp(-j\phi_{b,i}(\alpha_i, \varepsilon_i)/2) p_{r,b,i}(\alpha_i, \varepsilon_i)\sigma_{b,i}^2 / \delta_i^2\right) \tag{27}$$

Herein, $\sigma_{b,i}$ denotes the energy or power in sub-band b of signal $X_i$ and $\delta_i$ represents the distance of sound source i.

In a further embodiment of the invention, the filter unit 103 is alternatively based on a real-valued or complex-valued filter bank, i.e. IIR filters or FIR filters that mimic the frequency dependency of $h_{xy,b}$, so that an FFT approach is not required anymore.

In an auditory display, the audio output is conveyed to the listener either through loudspeakers or through headphones worn by the listener. Both headphones and loudspeakers have their advantages as well as shortcomings, and one or the other may produce more favorable results depending on the application. With respect to a further embodiment, more output channels may be provided, for example, for headphones using more than one speaker per ear, or a loudspeaker playback configuration.

Figure 7:
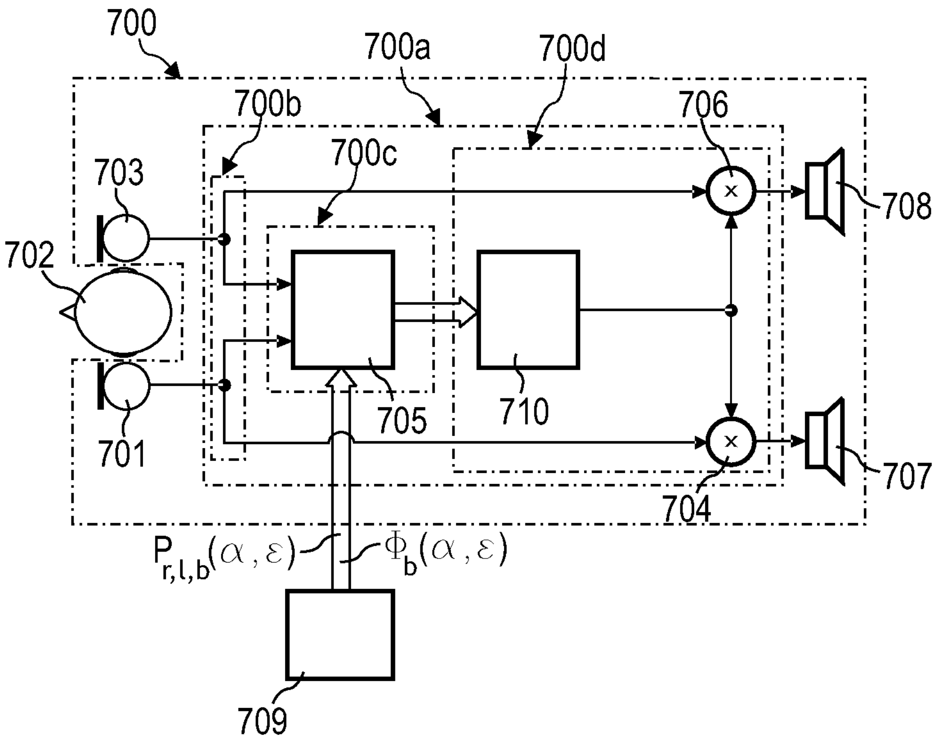
FIG. 7 shows a device for processing parameters representing Head-Related Transfer Functions (HRTFs) in accordance with a preferred embodiment of the invention.

A device 700*a* for processing parameters representing Head-Related Transfer Functions (HRTFs) in accordance with a preferred embodiment of the invention will now be described with reference to FIG. 7. The device 700*a* comprises an input stage 700*b* adapted to receive audio signals of sound sources, determining means 700*c* adapted to receive reference parameters representing Head-Related Transfer Functions and further adapted to determine, from said audio signals, position information representing positions and/or directions of the sound sources, processing means for processing said audio signals, and influencing means 700*d* adapted to influence the processing of said audio signals based on said position information yielding an influenced output audio signal.

In the present case, the device 700*a* for processing parameters representing HRTFs is adapted as a hearing aid 700.

The hearing aid 700 additionally comprises at least one sound sensor adapted to provide sound signals or audio data of sound sources to the input stage 700*b*. In the present case, two sound sensors are provided, which are adapted as a first microphone 701 and a second microphone 703. The first microphone 701 is adapted to detect sound signals from the environment, in the present case at a position close to the left ear of a human being 702. Furthermore, the second microphone 703 is adapted to detect sound signals from the environment at a position close to the right ear of the human being 702. The first microphone 701 is coupled to a first amplifying unit 704 as well as to a position-estimation unit 705. In a similar manner, the second microphone 703 is coupled to a second amplifying unit 706 as well as to the position-estimation unit 705. The first amplifying unit 704 is adapted to supply amplified audio signals to first reproduction means, i.e. first loudspeaker 707 in the present case. In a similar manner, the second amplifying unit 706 is adapted to supply amplified audio signals to second reproduction means, i.e. second loudspeaker 708 in the present case. It should be mentioned here that further audio signal-processing means for various known audio-processing methods may precede the amplifying units 704 and 706, for example, DSP processing units, storage units and the like.

In the present case, position-estimation unit 705 represents determining means 700*c* adapted to receive reference parameters representing Head-Related Transfer Functions and further adapted to determine, from said audio signals, position information representing positions and/or directions of the sound sources.

Downstream of the position information unit 705, the hearing aid 700 further comprises a gain calculation unit 710, which is adapted to provide gain information to the first amplifying unit 704 and second amplifying unit 706. In the present case, the gain calculation unit 710 together with the amplifying units 704, 706 constitutes influencing means 700*d* adapted to influence the processing of the audio signals based on said position information, yielding an influenced output audio signal.

The position information unit 705 is adapted to determine position information of a first audio signal provided from the first microphone 710 and of a second audio signal provided from the second microphone 703. In the present case, parameters representing HRTFs are determined as position information as described above in the context of FIG. 6 and device 600 for generating parameters representing HRTFs. In other words, one could measure the same parameters from incoming signal frames as one would normally measure from the HRTF impulse responses. Consequently, instead of having HRTF impulse responses as inputs to the parameter estimation stage of device 600, an audio frame of a certain length (for example, 1024 audio samples at 44.1 kHz) for the left and right input microphone signals is analyzed.

The position information unit 705 is further adapted to receive reference parameters representing HRTFs. In the present case, the reference parameters are stored in a parameter table 709 which is preferably adapted in the hearing aid 700. Alternatively, the parameter table 709 may be a remote database to be connected via interface means in a wired or wireless manner.

In other words, measuring parameters of sound signals that enter the microphones 701, 703 of the hearing aid 700 can do the analysis of directions or position of the sound sources. Subsequently, these parameters are compared with those stored in the parameter table 709. If there is a close match between parameters from the stored set of reference parameters of parameter table 709 for a certain reference position and the parameters from the incoming signals of sound sources, it is very likely that the sound source is coming from that same position. In a subsequent step, the parameters determined from the current frame are compared with the parameters that are stored in the parameter table 709 (and are based on actual HRTFs). For example: let it be assumed that a certain input frame results in parameters P_frame. In the parameter table 709, we have parameters P_HRTF($\alpha$, $\epsilon$), as a function of azimuth ($\alpha$) and elevation ($\epsilon$). A matching procedure then estimates the sound source position, by minimizing an error function E($\alpha$, $\epsilon$) that is E($\alpha$, $\epsilon$)=|P_frame−P_HRTF ($\alpha$, $\epsilon$)|^2 as a function of azimuth ($\alpha$) and elevation ($\epsilon$). Those values of azimuth ($\alpha$) and elevation (e) that give a minimum value for E correspond to an estimate for the sound source position.

In the next step, results of the matching procedure are provided to the gain calculation unit 710 to be used for calculating gain information that is subsequently provided to the first amplifying unit 704 and the second amplifying unit 706.

In other words, on the basis of parameters representing HRTFs, the direction and position, respectively, of the incoming sound signals of the sound source is estimated and the sound is subsequently attenuated or amplified on the basis of the estimated position information. For example, all sounds coming from a front direction of the human being 702 may be amplified; all sounds and audio signals, respectively, of other directions may be attenuated.

It is to be noted that enhanced matching algorithms may be used, for example, a weight approach using a weight per parameter. Some parameters then may get a different "weight" in the error function E($\alpha$, $\epsilon$) than other ones.

It should be noted that use of the verb "comprise" and its conjugations does not exclude other elements or steps, and use of the article "a" or "an" does not exclude a plurality of elements or steps. Also elements described in association with different embodiments may be combined.

It should also be noted that reference signs in the claims shall not be construed as limiting the scope of the claims.

The invention claimed is:

1. A device for processing parameters representing Head-Related Transfer Functions, the device comprising:

a splitter configured to split a first frequency-domain signal representing a first Head-Related impulse response signal into at least two sub-bands of the first Head-Related impulse response signal, wherein the splitter is further configured to split a second frequency-domain signal representing a second Head-Related impulse response signal into at least two sub-bands of the second Head-Related impulse response signal; and a generator configured to generate a first parameter of at least one of the two sub-bands of the first Head-Related impulse response signal based on an average root mean square value of the two sub-bands of the first Head-Related impulse response signal, wherein the generating is further configured to generate a second parameter of at least one of the two sub-bands of the second Head-Related impulse response signal based on an average root mean square value of the two sub-bands of the second Head-Related impulse response signal, wherein the generating is further configured to generate a third parameter representing a phase angle between the first frequency-domain signal and the second frequency-domain signal per sub-band; and wherein the generating is further configured to generate the Head-Related Transfer Function parameter representing the Head-Related Transfer Function by the first parameter, the second first parameter, and the third parameter.

2. The device of claim 1, further comprising a sampler configured to obtain the first frequency-domain signal by sampling with a sample length (N) a first time-domain Head-Related impulse response signal using a sampling rate (fs) yielding a first time-discrete signal, and transforming the first time-discrete signal to the frequency domain yielding said first frequency-domain signal.

3. The device of claim 2, wherein the sampler transforms the first time-discrete signal to the frequency domain based of FFT, and wherein the splitter splits the frequency-domain signals into the at least two sub-bands based on grouping FFT bins(k).

4. The device of claim 1, further comprising a sampler configured to obtain the second frequency-domain signal by sampling with a sample length (N) a second time-domain Head-Related impulse response signal using a sampling rate (fs) yielding a second time-discrete signal, and transforming the second time-discrete signal to the frequency domain yielding said second frequency-domain signal.

5. The device of claim 1, further comprising a processor configured to process the first parameter and the second parameter in a main frequency range, and to process the third parameter representing a phase angle in a sub-frequency range of the main frequency range.

6. The device of claim 5, wherein an upper frequency limit of the sub-frequency range is in a range between two kHz and three kHz.

7. The device of claim 1, wherein the first Head-Related impulse response signal and the second Head-Related impulse response signal belong to a same spatial position.

8. The device of claim 1, wherein the splitter performs the splitting of the first frequency-domain signal in such a way that the at least two sub-bands of the first Head-Related impulse response signal have a non-linear frequency resolution in accordance with psycho-acoustical principles.

* * * * *